United States Patent Office 2,778,879
Patented Jan. 22, 1957

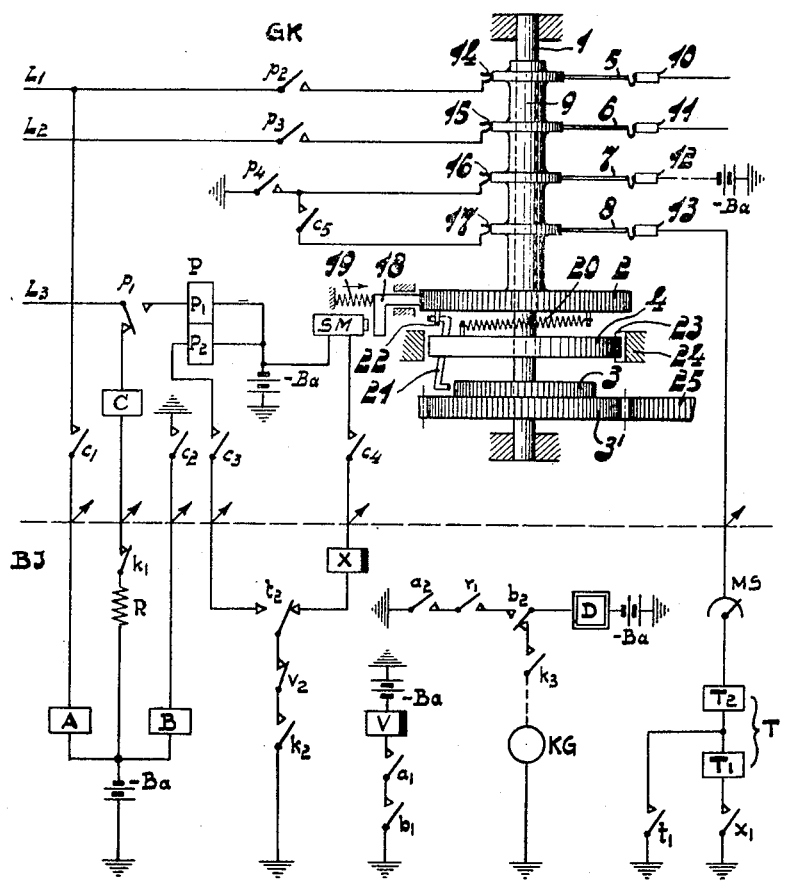

2,778,879

CONTROL DEVICE FOR USE IN AUTOMATIC SIGNALLING SYSTEM

Robert Bertold Buchner and Nicolaas Scheffer, Hilversum, Netherlands, assignors to Hartford National Bank and Trust Company, Hartford, Conn., as trustee Application July 19, 1951, Serial No. 237,624

Claims priority, application Netherlands July 27, 1950

2 Claims. (Cl. 179—18)

This invention relates to control devices for use in automatic signalling systems for stopping a switch on a desired contact.

Such devices are used, for example, for stopping a call finder switch on a calling line or for numerically adjusting a selector switch with the use of a marking system. A control device of this kind comprises means for controlling the movement of the switch and in addition means for testing the criteria of the outlet marking contacts as they are reached by a test wiper of the switch. As soon as a marking contact is reached, the criterion of which is similar to that of a desired marking contact, the test means react and the switch is arrested under the control of the control device.

It has been suggested to provide a switch the wiper supporting carriage of which is driven by an automatically controlling coupling mechanism which reacts to overload. This switch is stopped by causing a stopping pawl to engage a ratchet wheel connected to the wiper carriage with the result that the wiper carriage is arrested and the coupling mechanism is disengaged automatically. In addition, the switch is arranged so that upon disengagement of the coupling mechanism the outlet of this mechanism, which outlet is connected to the wiper carriage remains subjected, under the action of spring stress, to a torque acting in the original direction of rotation.

A switch of this kind has several advantages and is especially suitable for use in conjunction with the above-mentioned adjusting system. Thus, for example, the switch can be actuated at a high speed, for example, at a rate of 400 contacts per second, and the movement can be terminated suddenly upon reaching a desired marking contact without substantial risk of mechanical damage. The switch is operated by lifting the stopping pawl from the ratchet wheel with the use of a magnet, with the result that the wiper carriage is released and, under the action of the stressed spring is given a high speed in a short time.

However, it has been found in practice that difficulties may arise and under certain conditions the switch is not sufficiently dependable in operation. Experiments have revealed that such difficulties are due to the fact that for a short time after release the wiper carriage may acquire a speed which is much higher than the nominal speed.

This may result in that the testing means does not have available sufficient time per marking contact to test adequately and the switch is adjusted to an unwanted marking contact, or else that the testing means reacts with a comparative delay so that the stopping pawl engages a top of a tooth of the ratchet wheel consequently causing the stopping pawl and the tooth to be damaged.

The object of the invention is to mitigate the above difficulties.

According to the invention, the control device is such that the testing means can not be operated until a definite time after the means for arresting the wiper carriage have been disengaged, that is to say, after the switch has been started.

This may be provided in a simple manner, for example, by bringing the testing means into the circuit through contacts of a slow to be energized, or a slow to be released relay which is energized or de-energized by means of a contact of a relay by way of a contact of which the selector magnet for lifting the stopping pawl is energized.

Provision should be made for the delay time to be such that the wiper carriage has reached at least substantially its normal speed.

In order that the invention may be more clearly understood and readily carried into effect, it will now be described more fully with reference to the accompanying drawing, which shows diagrammatically a simplified form of a circuit-arrangement for positioning a group selector GK under the control of a control device BI which is common to a plurality of selectors.

The drive for the selector is shown diagrammatically in side elevation. Mounted on a stationary shaft 1 so as to be free to rotate are two ratchet wheels 2 and 3 and an auxiliary wheel 4. The selector switch is provided with four wipers 5, 6, 7 and 8 which, insulated from one another, are seated on a hollow shaft 9 which is rigidly connected to the ratchet wheel 2. During rotation of the ratchet wheel 2 the wipers wipe output contacts 10, 11, 12 and 13 and an electric connection with the wipers can be established by means of trailing rings 14, 15, 16 and 17. The ratchet wheel 3 is constantly driven with the use of a gear wheel 3' rigidly connected thereto by means not shown. The ratchet wheel 3 is in gear with a click 21 carried by the auxiliary wheel 4, which is connected to the ratchet wheel 2 by way of one or more springs 20. The ratchet wheel 2 carries in addition control means for a click mechanism 21, which are denoted diagrammatically by a stud 22.

During the movement of the switch the rotary magnet SM is energized so that an arresting catch 18 which is in gear with the ratchet wheel 2, is attracted with the result that the ratchet wheel 2 is free to rotate. Click mechanism 21 then engages the ratchet wheel 3 so that auxiliary wheel 4 is driven from the ratchet wheel 3 and the ratchet wheel 2 and the wipers 5, 6, 7 and 8 secured thereto are carried along with the ratchet wheel 4 by the spring clutch 20. On de-magnetization of rotary magnet SM the wipers are suddenly arrested due to the fact that arresting catch 18 engages the ratchet wheel 2 under the action of the compression spring 19. The auxiliary wheel 4 then continues its rotation for a short period so that it is rotated relatively with relation to the ratchet wheel 2. By reason of this relative rotation the control means 22 release the click mechanism 21 from the ratchet wheel 3. Back rotation of the auxiliary wheel 4, which is no longer driven by the ratchet wheel 3 but is still subjected to the action of the springs 20, is prevented by a ratchet-gear coupling with clamping rollers 23. These clamping rollers are arranged between the profiled periphery of the auxiliary wheel 4 and a cylindrical contact surface of a stationary part or shaft 1 which is arranged axially of the auxiliary wheel. In the rest condition of the switch the ratchet wheel 2 is consequently held by the catch 18 and is under the action of the springs 20, subjected to a torque acting in the original direction of rotation.

On the rotary magnet SM being magnetized arresting catch 18 is lifted and the ratchet wheel 2 is actuated under the action of the springs 20. The ratchet wheel 2 thus moves to its original position, taken up with relation to the auxiliary wheel 4. This results in that the control means 22 again throw the click mechanism 21 in gear with the ratchet wheel 3 and the driving connection between the ratchet wheels 2 and 3 is restored.

The circuit arrangement operates as follows. As the selector GK and the control device BI are engaged, the line $L_3$ is connected to earth potential by means not shown so that relay C is energized by break contact $p_1$ of relay P, winding of relay C, the top contact $k_1$ of the marking switch MS of the control device and resistor R. Relay B is energized by make contact $c_2$ of relay C. The selecting pulses are routed through line $L_1$ and make contact $c_1$ to the pulse relay A, which relay responds at any selecting pulse. At the beginning of the first selecting pulse the slow to be released shunting relay V is energized by way of make contact $a_1$ of relay A and make contact $b_1$ of relay B. Relay V is held attracted during the selecting pulse train until after its end. At every selecting pulse the rotary magnet D of the marking switch MS, which is constructed as a stepping switch, is energized by way of make contact $a_2$ of relay A, make contact $v_1$ of relay V and make contact $b_2$ of relay B and the marking switch performs one step. At the end of the selecting pulse train relay V becomes de-energized and the rotary magnet SM of the group selector GK is energized by way of make contact $c_4$ of relay C, the winding of the slow to be energized relay X, break contact $t_2$ of the test relay T, break contact $v_2$ of relay V and top contact $k_2$ of marking switch MS. Energization of the rotary magnet SM results in that the selecting switch GK is brought into use in the manner described hereinbefore for picking up the outlet marked by marking switch MS through the marking line 25, said outlet corresponding to the selected digit.

Since the wiper carriage of the selector is driven initially under the action of the springs 20 a speed may be reached by the switch a short period after the beginning of the movement, which speed is much higher than the normal speed. This may give rise to the risk that upon reaching the desired outlet the switch cannot be stopped sufficiently rapidly and may be set to an unwanted outlet. To avoid this, use is made of an auxiliary relay X the winding of which is included in series with the energizing circut of the rotary magnet SM. Relay X is slowly responsive so that it does not become energized until after the selector has travelled a certain distance and the speed of the selector has again reached substantially its normal value. Not until then is the make contact $x_1$ of relay X closed, so that a test circuit is prepared which extends through make contact $x_1$, the windings $T_1$ and $T_2$ of the test relay T, wiper and marking contact of marking switch MS, marking line 25, marking contact 13, wiper 8, trailing ring 17, make contact $c_5$ of relay C, trailing ring 16, wiper 7 and contact 12 to battery $Ba$. Relay T becomes energized in this circuit as soon as the switch GK reaches the desired outlet and, across its make contact $t_1$, short-circuits its high-ohmic winding $T_1$, so that the potential of marking contact 12 varies in such manner that the outlet is marked engaged. The opening of break contact $t_2$ of relay T results in that the rotary magnet SM is de-magnetized so that the arresting catch 18 engages the ratchet wheel 2 and the switch stops in the manner described hereinbefore. Relay P is energized by way of its second winding $P_2$, make contact $c_3$ of relay C, make contact $t_2$ of relay T, break contact $v_2$ and top contact $k_2$. Through its make contact $p_1$, relay P completes a holding circuit for itself across its winding $P_1$ and relay C becomes de-energized by reason of the opening of break contact $p_1$. Through its make contacts $p_2$ and $p_3$, relay P connects the lines $L_1$ and $L_2$ to wipers 5 and 6 of the switch. As relay C becomes de-energized, the relays B, T, V and X are also de-energized, after which the pulse-sender KG feeds pulses to the rotary magnet D through top contact $k_3$ of the marking switch MS and break contact $b_2$ of relay B until top contact $k_3$ opens as the normal position is reached by the marking switch MS.

What we claim is:

1. A control device for use in automatic signalling systems comprising a selector switch having a plurality of marked contacts for adjusting to a predetermined marked contact, said switch being provided with a wiper carriage, an automatically operating release clutch mechanism provided with driving and driven elements for actuating said wiper carriage, said clutch mechanism having a resilient means operatively connecting the driving and driven elements thereof, a part of said clutch mechansim connected to said wiper carriage and after release of said clutch mechanism still being subjected to a driving force in the original direction of movement of said clutch mechanism, a testing circuit including a slow operating relay testing the criteria of the marking contacts of said switch, arresting means for stopping said wiper carriage so that said switch adjusts to said marked contact, and said testing circuit being completed a predetermined time after the disconnection of said arresting means and after the wipers of said switch have passed several marking contacts.

2. A control device for use in automatic signalling systems comprising a selector switch having a plurality of marked contacts for adjusting to a predetermined marked contact, said switch being provided with a wiper carriage, an automatically operated release clutch mechanism for actuating said wiper carriage and having a resilient connecting element, a part of said clutch mechanism connected to said wiper carriage and after release of said clutch mechanism still being subjected to a driving force in the original direction of movement of said clutch mechanism, a testing circuit for testing the criteria of the marking contacts of said switch said testing circuit reacting to a predetermined marking, an arresting device for stopping said wiper carriage including a magnet, said arresting device being disengaged from operative engagement with said wiper carriage upon energization of said magnet and operatively engaged with said wiper carriage upon de-energization of the magnet of said control device, said arresting device being adapted to stop said switch on said marked contact, and said testing circuit including a slow operating relay controlling the current flow to said magnet whereby said testing circuit is completed a predetermined time after disconnection of said arresting device and after the wipers of said switch have passed several marking contacts.

References Cited in the file of this patent

UNITED STATES PATENTS

| | | |
|---|---|---|
| 1,663,230 | Aldendorff | Mar. 20, 1928 |
| 1,730,049 | Aldendorff | Oct. 1, 1929 |
| 1,900,912 | Christian | Mar. 14, 1933 |
| 1,900,917 | Deakin et al. | Mar. 14, 1933 |
| 2,093,242 | Humphries | Sept. 14, 1937 |
| 2,416,086 | Christian | Feb. 18, 1947 |
| 2,416,109 | Long | Feb. 18, 1947 |